(12) United States Patent
Byiringiro et al.

(10) Patent No.: US 11,556,736 B2
(45) Date of Patent: Jan. 17, 2023

(54) OPTIMIZING INFERENCE TIME OF ENTITY MATCHING MODELS

(71) Applicant: SAP SE, Walldorf (DE)

(72) Inventors: Auguste Byiringiro, Singapore (SG); Jiatai Qiang, Singapore (SG)

(73) Assignee: SAP SE, Walldorf (DE)

( * ) Notice: Subject to any disclaimer, the term of this patent is extended or adjusted under 35 U.S.C. 154(b) by 259 days.

(21) Appl. No.: 16/568,408

(22) Filed: Sep. 12, 2019

(65) Prior Publication Data

US 2021/0081705 A1  Mar. 18, 2021

(51) Int. Cl.
| | | |
|---|---|---|
| G06K 9/62 | (2022.01) | |
| G06N 5/04 | (2006.01) | |
| G06N 20/20 | (2019.01) | |
| G06V 10/771 | (2022.01) | |
| G06V 30/19 | (2022.01) | |
| G06V 10/74 | (2022.01) | |
| G06V 10/774 | (2022.01) | |

(52) U.S. Cl.
CPC ............ *G06K 9/623* (2013.01); *G06K 9/6215* (2013.01); *G06K 9/6257* (2013.01); *G06N 5/04* (2013.01); *G06N 20/20* (2019.01); *G06V 10/761* (2022.01); *G06V 10/771* (2022.01); *G06V 10/7747* (2022.01); *G06V 30/1912* (2022.01); *G06V 30/19093* (2022.01); *G06V 30/19147* (2022.01)

(58) Field of Classification Search
None
See application file for complete search history.

(56) References Cited

U.S. PATENT DOCUMENTS

| | | |
|---|---|---|
| 8,229,883 B2 | 7/2012 | Brauer et al. |
| 8,572,089 B2 | 10/2013 | Starks |
| 9,456,086 B1 | 9/2016 | Wu et al. |
| 10,282,616 B2 | 5/2019 | Gong et al. |

(Continued)

FOREIGN PATENT DOCUMENTS

WO    2019043352    3/2019

OTHER PUBLICATIONS

P. Dollar, Z. Tu, H. Tao and S. Belongie, "Feature Mining for Image Classification," 2007 IEEE Conference on Computer Vision and Pattern Recognition, 2007, pp. 1-8, doi: 10.1109/CVPR.2007.383046. (Year: 2007).*

(Continued)

*Primary Examiner* — Emily C Terrell
*Assistant Examiner* — Nathan J Bloom
(74) *Attorney, Agent, or Firm* — Fish & Richardson P.C.

(57) ABSTRACT

Methods, systems, and computer-readable storage media for receiving input data including a set of entities of a first type and a set of entities of a second type, providing a set of features based on entities of the first type, the set of features including features expected to be included in entities of the second type, filtering entities of the second type based on the set of features to provide a sub-set of entities of the second type, and generating an output by processing the set of entities of the first type and the sub-set of entities of the second type through a ML model, the output comprising a set of matching pairs, each matching pair in the set of matching pairs comprising an entity of the set of entities of the first type and at least one entity of the sub-set of entities of the second type.

20 Claims, 4 Drawing Sheets

(56) References Cited

U.S. PATENT DOCUMENTS

| | | | | |
|---|---|---|---|---|
| 2015/0278594 | A1* | 10/2015 | Copsey | G06K 9/00912 |
| | | | | 382/112 |
| 2018/0336226 | A1* | 11/2018 | Anorga | G06N 20/00 |
| 2020/0082212 | A1* | 3/2020 | Alcock | G06K 9/6215 |
| 2020/0410397 | A1* | 12/2020 | Chae | G06K 9/6256 |

OTHER PUBLICATIONS

Gnana, D. Asir Antony, S. Appavu Alias Balamurugan, and E. Jebamalar Leavline. "Literature review on feature selection methods for high-dimensional data." International Journal of Computer Applications 136.1 (2016): 9-17. (Year: 2016).*

Papadakis G, Svirsky J, Gal A, Palpanas T. Comparative analysis of approximate blocking techniques for entity resolution. Proceedings of the VLDB Endowment. May 1, 2016;9(9):684-95. (Year: 2016).*

U.S. Appl. No. 16/430,674, filed Jun. 4, 2019, Byiringiro et al.

Mudgal et al., "Deep learning for entity matching: A design space exploration." Proceedings of the 2018 International Conference on Management of Data, Mar. 2018, 16 pages.

* cited by examiner

OPTIMIZING INFERENCE TIME OF ENTITY MATCHING MODELS

BACKGROUND

In general, machine learning includes training a machine learning (ML) model that receives input and provides some output. Machine learning can be used in a variety of problem spaces. An example problem space includes matching items of one entity to items of another entity. Examples include, without limitation, matching questions to answers, people to products, and bank statements to invoices.

A lifecycle of a ML model includes training, production and, in some instances, re-training. During training, the ML model is trained to provide predictions as output based on input. The ML model is trained using domain-specific training data to enable the ML model to make accurate predictions. In the examples problem space, the ML model can be trained using training data that includes entity matches. Once trained, the ML model can be used in a production environment to provide predictions based on input (also referred to as inference). That is, during inference, the trained ML model is used to provide predictions from the inputs that it receives (e.g., predict matches of entities).

However, the most accurate ML models are relatively complex. Complexity of an ML model results in the time associated with the ML model being longer. For example, both training time and inference time are longer. In additional, more technical resources (e.g., computing power, memory) are consumed. In some instances, a relatively long training time can be acceptable. However, an inference time that is too long will often render the ML model unusable in practice. Therefore, there is a tradeoff between ML model accuracy/complexity and time.

SUMMARY

Implementations of the present disclosure are directed to time- and resource-efficient matching of entities using machine learning (ML) models. More particularly, implementations of the present disclosure are directed to filtering a set of entities that are to be matched to provide a sub-set of entities based on one or more features identified by a classifier.

In some implementations, actions include receiving input data including a set of entities of a first type and a set of entities of a second type, providing a set of features based on entities in the of entities of the first type, the set of features including one or more features expected to be included in entities in the set of entities of the second type, filtering the set of entities of the second type based on the set of features to provide a sub-set of entities of the second type, and generating an output by processing the set of entities of the first type and the sub-set of entities of the second type through a ML model, the output comprising a set of matching pairs, each matching pair in the set of matching pairs comprising an entity of the set of entities of the first type and at least one entity of the sub-set of entities of the second type. Other implementations of this aspect include corresponding systems, apparatus, and computer programs, configured to perform the actions of the methods, encoded on computer storage devices.

These and other implementations can each optionally include one or more of the following features: providing the set of features based on entities in the of entities of the first type includes identifying features expected to be included in entities of the set of entities of the second type by processing entities of the set of entities of the first type through a classifier; the classifier includes a ML algorithm that is trained based on correlations between one or more features of entities of the first type and one or more features of entities of the second type; correlations are provided by one or more of domain knowledge and statistical analysis; the one or more features include categorical features; filtering the set of entities of the second type based on the set of features to provide a sub-set of entities of the second type includes, for each entity in the set of entities of the second type, determining whether the entity includes at least one feature of the set of features, and removing the entity from the set of entities of the second type, if the entity is absent a feature of the set of features; and the first type includes bank statements and the second type includes invoices.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to time- and resource-efficient matching of entities using machine learning (ML) models. More particularly, implementations of the present disclosure are directed to filtering a set of entities that are to be matched to provide a sub-set of entities based on one or more features identified by a classifier. Implementations can include actions of receiving input data including a set of entities of a first type and a set of entities of a second type, providing a set of features based on entities in the of entities of the first type, the set of features including one or more features expected to be included in entities in the set of entities of the second type, filtering the set of entities of the second type based on the set of features to provide a sub-set of entities of the second type, and generating an output by processing the set of entities of the first type and the sub-set of entities of the second type through a ML model, the output comprising a set of matching pairs, each matching pair in the set of matching pairs comprising an entity of the set of entities of the first type and at least one entity of the sub-set of entities of the second type.

Implementations of the present disclosure are described in further detail with reference to an example problem space that includes matching bank statements to invoices. More particularly, implementations of the present disclosure are described with reference to the problem of, given a bank statement (e.g., a computer-readable electronic document recording data representative of the bank statement), determining one or more invoices that the bank statement matches to (e.g., each invoice being a computer-readable electronic document recording data representative of the invoice). It is contemplated, however, that implementations of the present disclosure can be realized in any appropriate problem space. For example, implementations of the present disclosure can be realized in a video-on-demand (VOD) system that matches a user to one or more videos that the user is likely to be interested in.

To provide context for implementations of the present disclosure, and as introduced above, a ML model can be used to match items of one entity to items of another entity. Examples include, without limitation, matching questions to answers, people to products, and bank statements to invoices, in accordance with the example problem space. A lifecycle of a ML model includes training, production and, in some instances, re-training. During training, the ML model is trained to provide predictions as output based on input. The ML model is trained using domain-specific training data to enable the ML model to make accurate predictions. In the example problem space, the ML model can be trained using training data that includes bank statement-to-invoice matches. Once trained, the ML model can be used in a production environment to provide predictions based on input, which process can be referred to as inference. That is, during inference, the trained ML model is used to provide predictions from the inputs that it receives (e.g., predict matches of invoices to bank statements).

However, the most accurate ML models are relatively complex. Complexity of an ML model results in the time associated with the ML model being longer. For example, both training time and inference time are longer. In additional, more technical resources (e.g., computing power, memory) are consumed. In some instances, a relatively long training time can be acceptable. However, an inference time that is too long will often render the ML model unusable in practice. This is especially true when the ML model is used in a cloud environment. In such instances, inference calls (e.g., requests transmitted to the ML model) are numerous, simultaneous, and spontaneous.

In view of the above context, implementations of the present disclosure provide a ML platform that optimizes inference time of ML models used to match entities. As described in further detail herein, the ML platform of the present disclosure reduces the inference time required by a ML model to provide a prediction. In this manner, the ML model is more practical for production use and technical resources (e.g., computing power, memory) are conserved.

In an example entity matching scenario, a set of M entities of type A is sent to the ML model along with a set of N entities of type B. In such scenarios, there are M×N possible pairs for matching. For each pair, the ML model predicts whether the paired entities are a match. Larger numbers of either or both of M and N yield longer inference times. However, some type A entities might not match with any type B entity and vice-versa. Consequently, attempts to match such entities can result in false negatives and consume time and resources. Accordingly, and as described in further detail herein, implementations of the present disclosure are directed to filtering out unmatchable pairs prior to inference of the ML model. In this manner, the input data to the ML model is reduced and the inference time of the ML model is correspondingly reduced, because the ML model handles smaller input sets.

Figure 1:
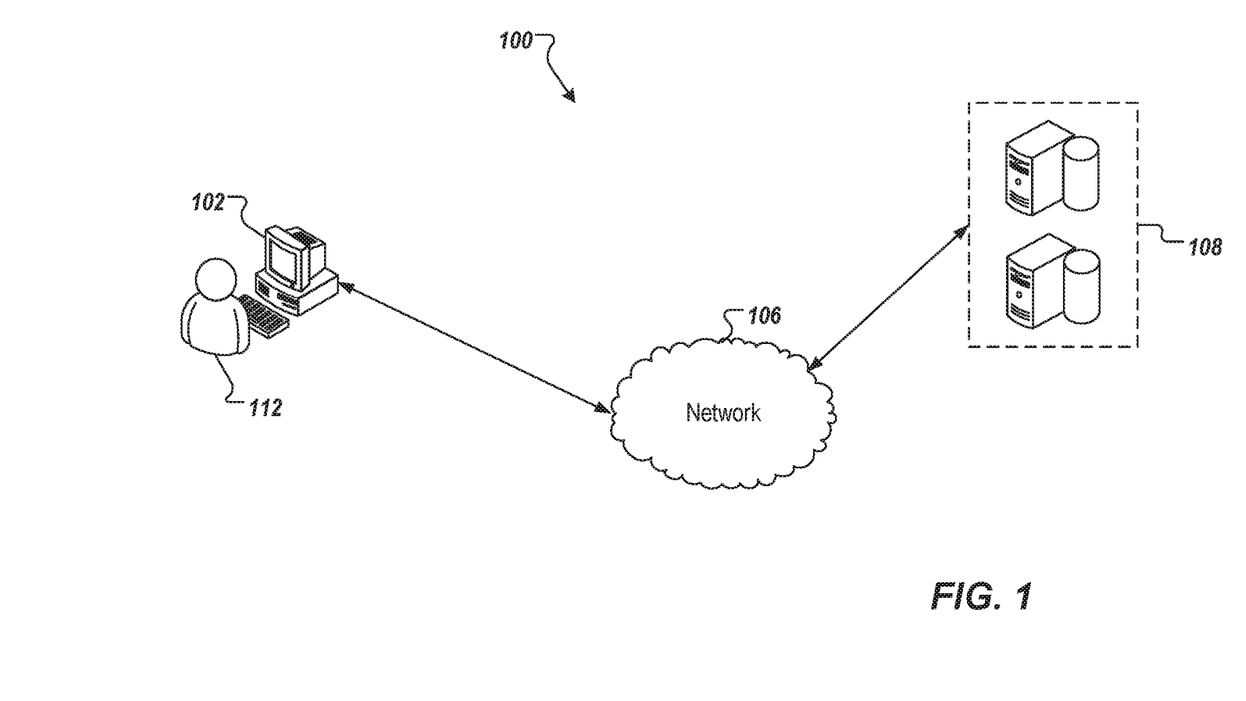
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML-based platform for matching of entities (e.g., electronic documents). That is, the server system 104 can receive computer-readable electronic documents (e.g., bank statements, invoices), and can match electronic documents (e.g., a bank statement to one or more invoices).

As introduced above, implementations of the present disclosure are directed to ML platform for matching items from one entity to those of another entity. In particular, implementations of the present disclosure can be realized in the domain of matching bank statements to invoices to optimize the inference time required by a ML model to provide predicted matches. In this manner, the ML model is more practical for production use and technical resources (e.g., computing power, memory) are conserved.

In further detail, implementations of the present disclosure address entity matching problems where multiple types of entities are to be matched. For example, entities of a type A (e.g., invoices) are to be matched to entities of a type B (e.g., bank statements). In some examples, a set of M entities of type A is to be matched to a set of N entities of type B by a ML model. For purposes of illustration, and without limiting the scope of the present disclosure, an example a scenario can include a single entity of type A (i.e., M=1) that is to be matched with one or more entities in the set of N entities of type B. This can be generalized to the case where M>1 entities of type A. AML model is trained to match the particular types of entities and can be denoted as EMA (e.g., entity matching algorithm).

In accordance with implementations of the present disclosure, a classifier C is used to reduce a number of entities that are to be processed by the EMA (i.e., the ML model). For example, the classifier can receive the set of M entities of type A (e.g., a set of entities of type A being denoted as $\{entity_A\}$) and the set of N entities of type B (e.g., a set of entities of type B being denoted as $\{entity_B\}$) and provides an output that can be used to reduce the set of N entities of type B to a set of n entities of type B, where n<N. The set of M entities of type A and the set of n entities of type B are provided to the EMA, which provides matches between entities of set of M entities of type A and entities of the set of n entities of type B (e.g., one or more matches from M×n possible matching pairs, where M×n<M×N).

In further detail, a feature Y can be identified for entities of type B, where $y_i$ is the $i^{th}$ most probable feature of all features of entities of type B. In some examples, features can be provided as categorical features. In the example use case, example categorical features can include, without limitation, customer identifiers (Customer ID), amount, creation date, due date, memo line (MEMOLINE). A set of features X can be identified for entities of type B. As described in further detail herein, set of features X can be provided as input to the classifier C, which predicts the feature Y based on the set of features X. A value k is provided an represents a number of most probable features (e.g., categorical features) that can be used to filter entities from the set of N type B entities to provide the set of n type B entities. In some implementations, a filter function (filter) filters one or more entities from the set of N entities of type B based on the top k most probable features in Y (e.g., filter($\{entity_E\}$, k)). In some examples, a set of entities E ($\{entity_E\}$) is defined as the set of n entities of type B. In some examples, a time taken during inference by an entity matching algorithm ALG0 to match a given set of entities E1 with a given set of entities E2 is provided as inferenceTime$_{ALGO}$($\{entity_{E1}\}$, $\{entity_{E2}\}$). As described in further detail herein, implementations of the present disclosure reduce the inference time by filtering one of the types of entities.

In accordance with implementations of the present disclosure, and as introduced above, the classifier C is trained based on one or more features Y among the all features of entities of type B and the set of features X of entities of type A. In some implementations, the feature Y is selected as a feature that is highly available in entities of type B. That is, the feature Y is selected as a feature that very frequently appears in entities of type B. In some examples, the feature Y is selected as a feature that is provided in 100% of entities of type B. In the example use case, where entities of type B include invoices, a Customer ID (or DEBTOR) is selected as the (categorical) feature Y. For example, the Customer ID (or DEBTOR) is populated in all invoices.

In some implementations, the set of features X of entities of type A is defined. In some examples, features of entities of type A are selected for inclusion in the set of features X based on correlation to the feature Y. In some examples, a correlation can be provided based on statistical analysis and/or domain knowledge. For example, a domain expert may know, from experience, that a particular feature of entities of type A correlates to one or more features of entities of type B. As another example, features of entities can be processed through a statistical analysis tool that can be used to provide a measurement of correlation between features of entities, and correlated features can be selected based on respective measurements. For example, and in the example use case, the Customer ID (e.g., the feature Y) of an invoice is associated with the customer name. In bank statements (e.g., entities of type B), the customer name is often partially or fully present in the MEMOLINE. Consequently, there is a correlation between the Customer ID of an invoice and the MEMOLINE of a bank statement, and MEMOLINE can be included in the set of features X.

The classifier C is trained to predict the feature Y based on the set of features X. An example feature X can include a memoline of the bank statement in the context of bank statement to invoice matching. Once trained, the classifier C is deployed to the production environment to be used during inference, as described herein. In further detail, and without limitation, the classifier C can be provided as a neural network containing an embedding layer, followed by a bidirectional long short-term memory (LSTM) layer, followed by a self-attention layer, followed by a dense layer and finalized by a softmax layer. In some examples, the softmax layer has as many outputs as the different values that Y can take. By way of non-limiting example, the neural network can be trained with the optimizer Adam and a categorical cross entropy loss.

During inference, the set of M entities of type A and the set of N entities of type B are received. The classifier is used to determine (predict) the feature(s) Y associated with the set of M entities of type A. In some examples, this can be generalized to predicting the k most probable features ($Y_1$, $Y_2$, ..., $Y_k$) in order to reduce a number of false negatives (FN), which would result by executing inference using the entire set of N entities of type B. That is, instead of predicting a single feature Y, the classifier C can predict a set of features Y (e.g., where Y={$Y_1, Y_2, ..., Y_k$}). Entities that do not include the feature Y (or any of the features $Y_1$, $Y_2$, ..., $Y_k$) are removed (filtered) from the set of N entities of type B to provide the set of n entities of type B (e.g., $\{entity_E\}$). Entities that are filtered include entities that would have resulted in FN in the subsequent matching process. Consequently, by filtering such entities, occurrences of FN can be reduced (e.g., to 0).

In some implementations, the set of M entities of type A and the set of n entities of type B (also referred to herein as the set of entities E ($\{entity_E\}$)) are provided as input to the ERM, which provides a set of Q matched pairs as output. Each pair in the set of Q matched pairs includes an entity of type A paired with (matched to) an entity of type B (e.g., an invoice matched to a bank statement).

Figure 2:
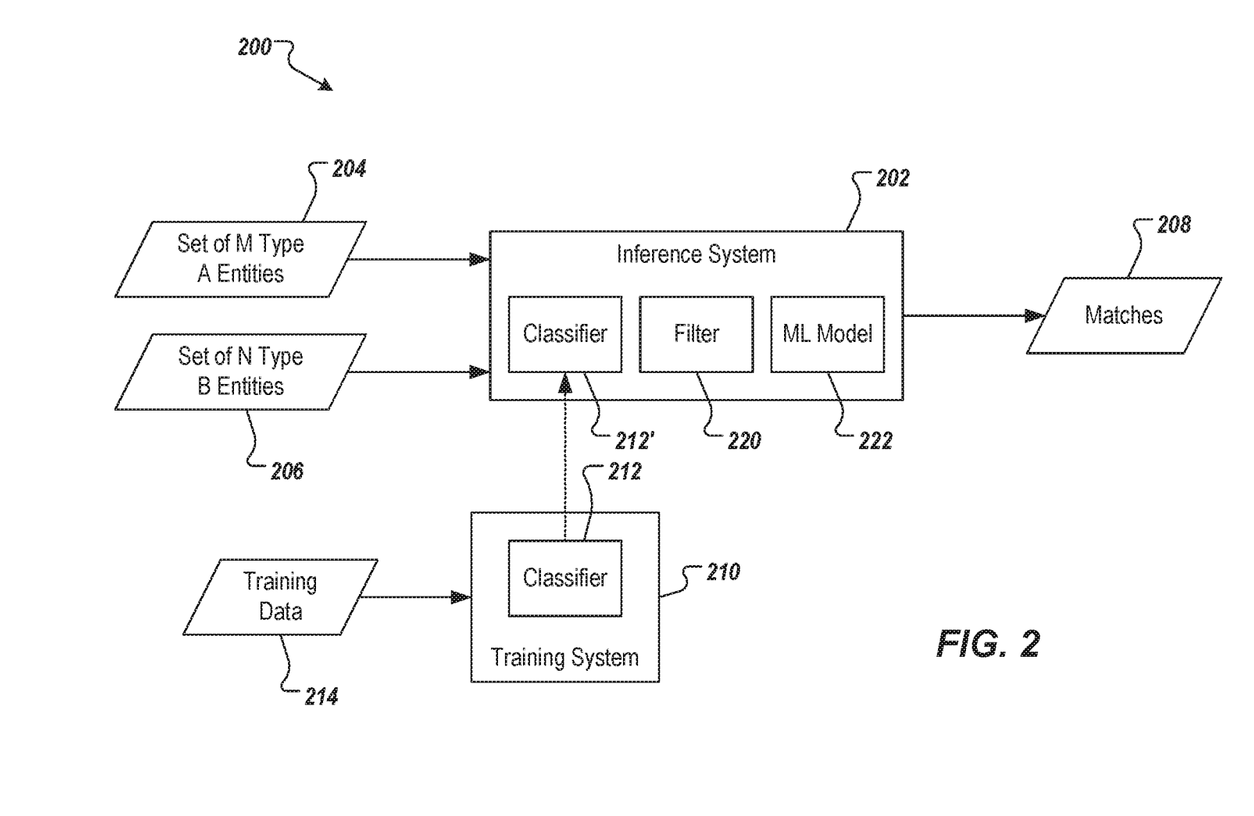
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an inference system 202 that processes a first data set 204 (e.g., a set of M entities of type A) and a second data set 206 (e.g., a set of N entities of type B) to provide an output 208 (e.g., a set of Q matched pairs). In some examples, the inference system 202 is hosted in a cloud computing environment and can receive inference calls (e.g., requests for matching entities, the requests each including a first data set 204 and a second data set 206) that are numerous, simultaneous, and spontaneous.

The conceptual architecture 200 also includes a training system 210 that trains a classifier 212 (e.g., the classifier C) using training data 214. In some examples, and as described herein, the classifier 212 is trained to predict a set of features Y (e.g., where Y={$Y_1, Y_2, \ldots, Y_k$}, and k is an integer that is >1). The classifier 212 is trained based on one or more features of entities of type A (e.g., Customer ID) and correlated features of entities of type B (e.g., MEMOLINE), and is deployed to the inference system 202 (e.g., as a trained classifier 212').

In the example of FIG. 2, the inference system 202 further includes a filter module 220 and a ML model module 222. During inference, the classifier 212' predicts a set of features Y (e.g., where Y={$Y_1, Y_2, \ldots, Y_k$}) based on one or more of the first data set 204 and the second data set 206. The classifier 212' provides the set of features Y to the filter module 220. The filter module 220 processes the second data set 206 in view of the set of features Y to filter one or more entities from the second data set 206. That is, and as described in detail herein, the filter module 220 removes (filters) entities that do not include any of the features in the set of features Y from the set of N entities of type B to provide the set of n entities of type B (e.g., {entity$_E$}).

The ML model module 222 receives the set of M entities of type A (i.e., the first data set 204) and the set of n entities of type B (i.e., a filtered version of the second data set 206) and provides the output 208. That is, the ML module 222 processes the set of M entities of type A and the set of n entities of type B through the EMR to provide the output 208.

Figure 3:
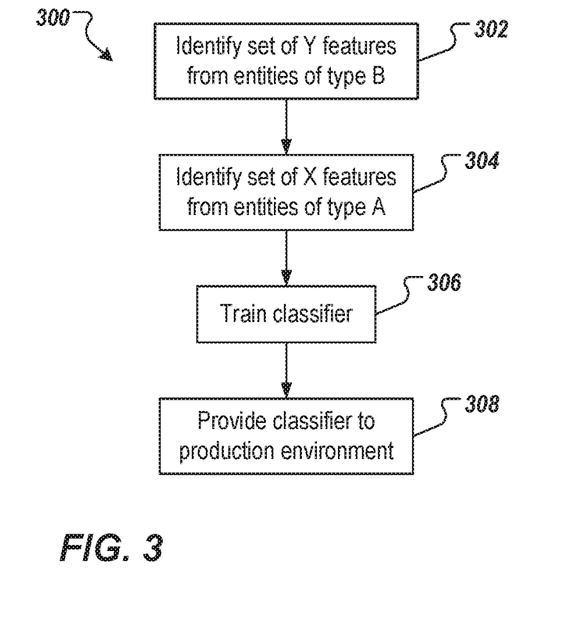
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A set of features of entities of type B are identified (302). For example, entities of type B can include bank statements (e.g., provided as one or more computer-readable documents). In some examples, a feature in the set of features can include a memoline of bank statements. A set of features of entities of type A are identified (304). For example, entities of type A can include invoices (e.g., provided as one or more computer-readable documents). In some examples, a feature in the set of features can include a customer identifier of invoices. A classifier is trained (306). For example, and as described above, a classifier C can be provided as a neural network containing an embedding layer, followed by a bidirectional LSTM layer, followed by a self-attention layer, followed by a dense layer and finalized by a softmax layer, which can be trained with the optimizer Adam and a categorical cross entropy loss. In some examples, the classifier C is trained using historical data (e.g., known invoice-to-bank statement matches) in the training system 210 of FIG. 2. The classifier is deployed to a production environment (308). For example, the classifier C is deployed as the classifier 212' to the inference system 202 of FIG. 2.

Figure 4:
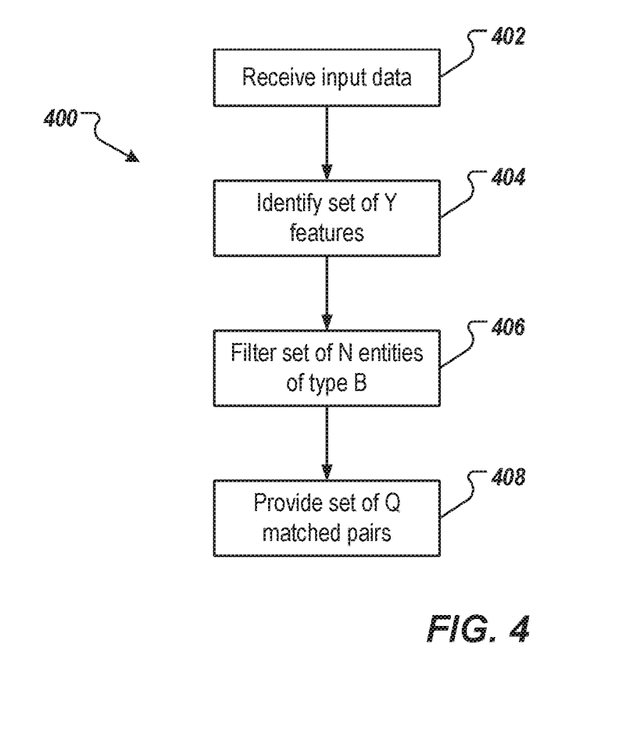
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Input data is received (402). For example, a first data set 204 (e.g., a set of M entities of type A) and a second data set 206 (e.g., a set of N entities of type B) are received by the inference system 202 of FIG. 2. A set of Y features is identified (404). For example, the classifier 212' predicts a set of features Y (e.g., where Y={$Y_1, Y_2, \ldots, Y_k$}) based on one or more of the first data set 204 and the second data set 206. The classifier 212' provides the set of features Y to the filter module 220. The set of N entities of type B is filtered (406). For example, the filter module 220 processes the second data set 206 in view of the set of features Y to filter one or more entities from the second data set 206. That is, and as described in detail herein, the filter module 220 removes (filters) entities that do not include any of the features in the set of features Y from the set of N entities of type B to provide the set of n entities of type B (e.g., {entity$_E$}). A set of Q matched pairs is provided (408). For example, the ML model module 222 receives the set of M entities of type A (i.e., the first data set 204) and the set of n entities of type B (i.e., a filtered version of the second data set 206) and provides the output 208. That is, the ML module 222 processes the set of M entities of type A and the set of n entities of type B through the EMR to provide the output 208.

Figure 5:
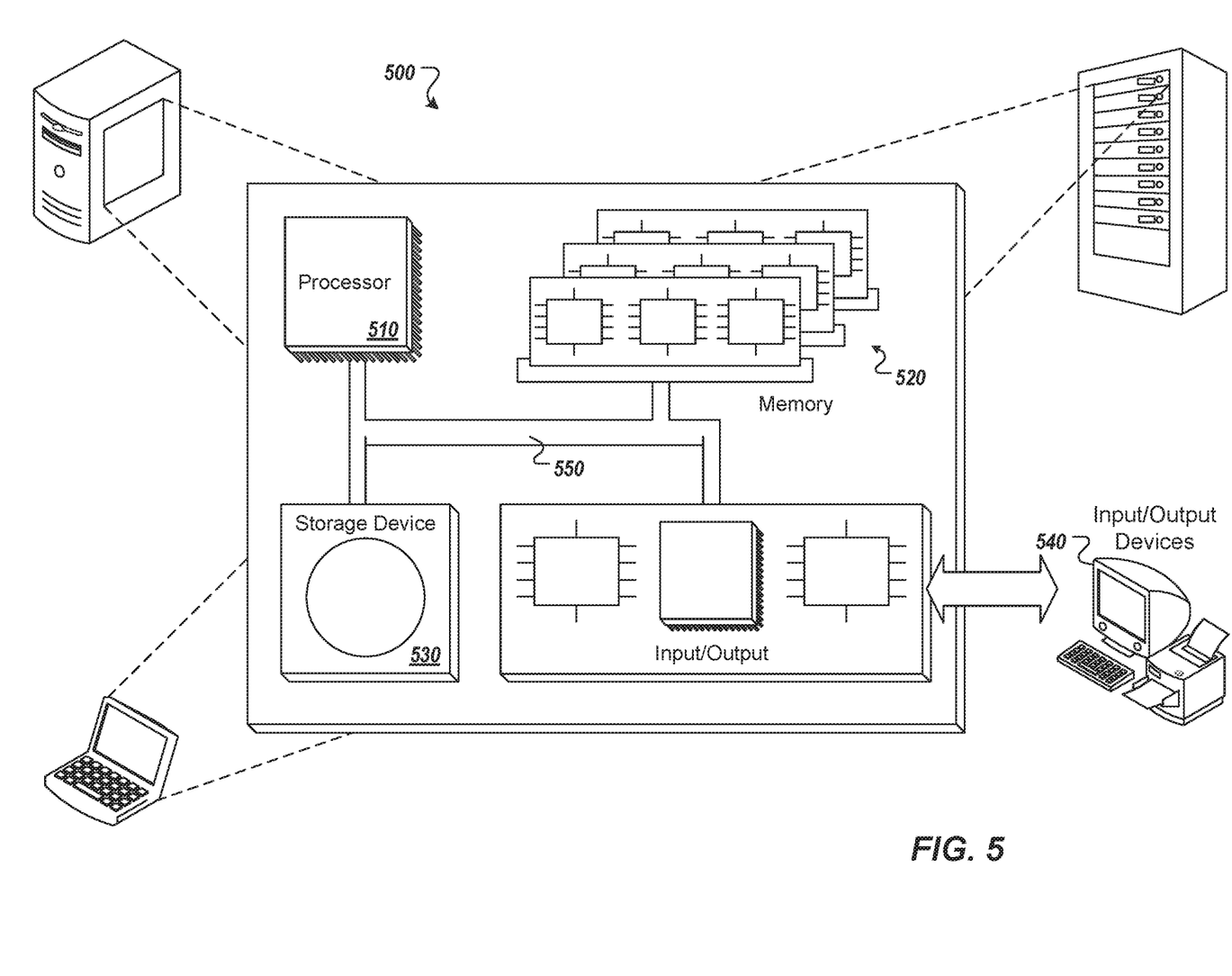
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching entities in a machine learning (ML)-based inference system, the method being executed by one or more processors and comprising:
    receiving input data comprising a first set of entities of a first type and a second set of entities of a second type, the first type being different from the second type;
    inputting, into a classifier, a first set of features representing features of entities of the first type;
    receiving, as output of the classifier, a sub-set of features of the first set of features, the sub-set of features comprising one or more features of entities in the first set of entities that are expected to be included in entities in the second set of entities;
    prior to matching entities in the first set of entities to entities in the second set of entities, filtering the second set of entities based on the sub-set of features to provide a sub-set of entities of the second type, the sub-set of entities comprising fewer entities than the second set of entities, each entity in the sub-set of entities having at least one feature in the sub-set of features and each entity filtered from the second set of entities being absent any feature in the sub-set of features; and
    generating an output by processing the first set of entities and the sub-set of entities through a ML model that is distinct from the classifier, the output comprising a set of matching pairs, each matching pair in the set of matching pairs comprising an entity of the first set of entities and at least one entity of the sub-set of entities.

2. The method of claim 1, wherein providing the set of features based on entities in the first set of entities comprises identifying features expected to be included in entities of the second set of entities by processing entities of the first set of entities through the classifier.

3. The method of claim 2, wherein the classifier comprises a ML algorithm that is trained based on correlations between one or more features of entities of the first type and one or more features of entities of the second type.

4. The method of claim 3, wherein correlations are provided by one or more of domain knowledge and statistical analysis.

5. The method of claim 1, wherein the one or more features comprise categorical features.

6. The method of claim 1, wherein filtering the second set of entities based on the set of features to provide a sub-set of entities of the second type comprises, for each entity in the second set of entities, determining whether the entity includes at least one feature of the set of features, and removing the entity from the set of entities of the second type, if the entity is absent a feature of the set of features.

7. The method of claim 1, wherein the first type comprises bank statements and the second type comprises invoices.

8. A non-transitory computer-readable storage medium coupled to one or more processors and having instructions stored thereon which, when executed by the one or more processors, cause the one or more processors to perform operations for matching entities in a machine learning (ML)-based inference system, the operations comprising:

receiving input data comprising a first set of entities of a first type and a second set of entities of a second type, the first type being different from the second type;

inputting, into a classifier, a first set of features representing features of entities of the first type;

receiving, as output of the classifier, a sub-set of features of the first set of features, the sub-set of features comprising one or more features of entities in the first set of entities that are expected to be included in entities in the second set of entities;

prior to matching entities in the first set of entities to entities in the second set of entities, filtering the second set of entities based on the sub-set of features to provide a sub-set of entities of the second type, the sub-set of entities comprising fewer entities than the second set of entities, each entity in the sub-set of entities having at least one feature in the sub-set of features and each entity filtered from the second set of entities being absent any feature in the sub-set of features; and generating an output by processing the first set of entities and the sub-set of entities through a ML model that is distinct from the classifier, the output comprising a set of matching pairs, each matching pair in the set of matching pairs comprising an entity of the first set of entities and at least one entity of the sub-set of entities.

9. The computer-readable storage medium of claim 8, wherein providing the set of features based on entities in the first set of entities comprises identifying features expected to be included in entities of the second set of entities by processing entities of the first set of entities through the classifier.

10. The computer-readable storage medium of claim 9, wherein the classifier comprises a ML algorithm that is trained based on correlations between one or more features of entities of the first type and one or more features of entities of the second type.

11. The computer-readable storage medium of claim 10, wherein correlations are provided by one or more of domain knowledge and statistical analysis.

12. The computer-readable storage medium of claim 8, wherein the one or more features comprise categorical features.

13. The computer-readable storage medium of claim 8, wherein filtering the second set of entities based on the set of features to provide a sub-set of entities of the second type comprises, for each entity in the second set of entities, determining whether the entity includes at least one feature of the set of features, and removing the entity from the set of entities of the second type, if the entity is absent a feature of the set of features.

14. The computer-readable storage medium of claim 8, wherein the first type comprises bank statements and the second type comprises invoices.

15. A system, comprising:
a computing device; and
a computer-readable storage device coupled to the computing device and having instructions stored thereon which, when executed by the computing device, cause the computing device to perform operations for matching entities in a machine learning (ML)-based inference system, the operations comprising:

receiving input data comprising a first set of entities of a first type and a second set of entities of a second type, the first type being different from the second type;

inputting, into a classifier, a first set of features representing features of entities of the first type;

receiving, as output of the classifier, a sub-set of features of the first set of features, the sub-set of features comprising one or more features of entities in the first set of entities that are expected to be included in entities in the second set of entities;

prior to matching entities in the first set of entities to entities in the second set of entities, filtering the second set of entities based on the sub-set of features to provide a sub-set of entities of the second type, the sub-set of entities comprising fewer entities than the second set of entities, each entity in the sub-set of entities having at least one feature in the sub-set of features and each entity filtered from the second set of entities being absent any feature in the sub-set of features; and generating an output by processing the first set of entities and the sub-set of entities through a ML model that is distinct from the classifier, the output comprising a set of matching pairs, each matching pair in the set of matching pairs comprising an entity of the first set of entities and at least one entity of the sub-set of entities.

16. The system of claim 15, wherein providing the set of features based on entities in the first set of entities comprises identifying features expected to be included in entities of the second set of entities by processing entities of the first set of entities through the classifier.

17. The system of claim 16, wherein the classifier comprises a ML algorithm that is trained based on correlations between one or more features of entities of the first type and one or more features of entities of the second type.

18. The system of claim 17, wherein correlations are provided by one or more of domain knowledge and statistical analysis.

19. The system of claim 15 wherein the one or more features comprise categorical features.

20. The system of claim 15, wherein filtering the second set of entities based on the set of features to provide a sub-set of entities of the second type comprises, for each entity in the second set of entities, determining whether the entity includes at least one feature of the set of features, and removing the entity from the set of entities of the second type, if the entity is absent a feature of the set of features.

* * * * *